June 28, 1966  O. HERMANN  3,257,880
CHUCK DEVICE AND METHOD OF ACTUATING
Filed April 8, 1964  3 Sheets-Sheet 1

FIG-1

INVENTOR.
OTTO HERMANN
BY Toulmin & Toulmin
ATTORNEYS

June 28, 1966  O. HERMANN  3,257,880
CHUCK DEVICE AND METHOD OF ACTUATING
Filed April 8, 1964  3 Sheets-Sheet 2
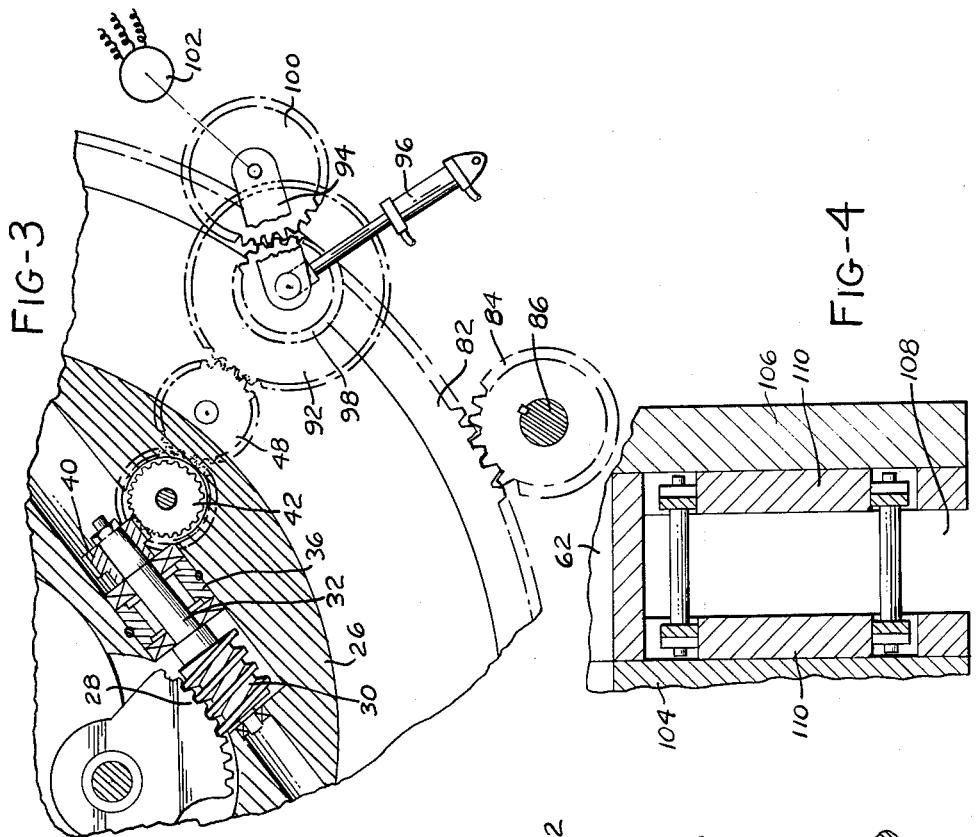
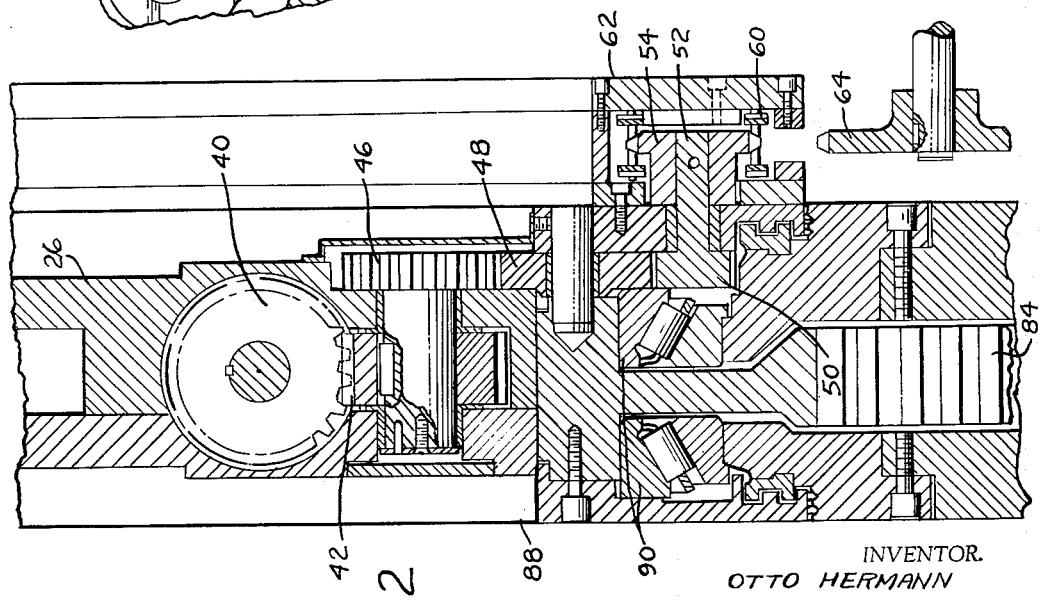
INVENTOR.
OTTO HERMANN
BY
Toulmin & Toulmin
ATTORNEYS

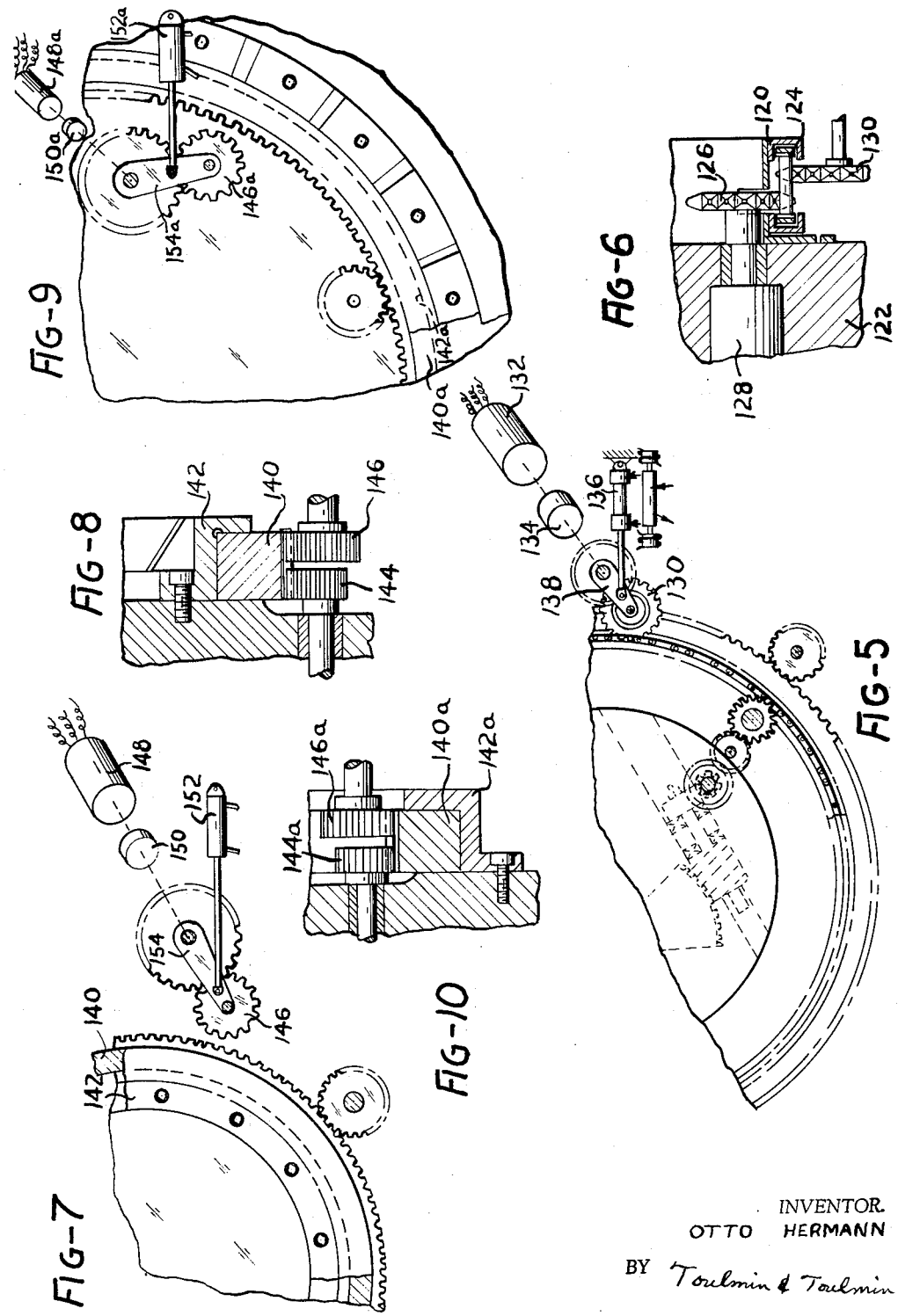

United States Patent Office 3,257,880
Patented June 28, 1966

3,257,880
CHUCK DEVICE AND METHOD OF ACTUATING
Otto Hermann, Cincinnati, Ohio, assignor to The R. K. LeBlond Machine Tool Company, Cincinnati, Ohio, a corporation of Delaware
Filed Apr. 8, 1964, Ser. No. 358,250
10 Claims. (Cl. 82—40)

The present invention relates to lathe chucks and is particularly concerned with a center drive chuck of the type employed for chucking crankshafts during the turning of the bearing regions thereof.

Center drive chucks of the nature referred to are known and are widely used in crankshaft lathes and comprise, in general, rotary body members through which the crankshaft extends and comprising jaw means to grip the crankshaft for rotation with the chuck on a predetermined axis while the chuck is rotatably supported adjacent the periphery thereof and is driven by gearing in rotation to rotate the crankshaft.

Since the entire chuck rotates, it has heretofore been necessary to stop the chuck at a predetermined position at the end of a machining cycle to permit a wrench to be engaged with a nut or the like on the chuck for opening the chuck to permit the crankshaft to be removed therefrom. With the chuck in the same position a new crankshaft is inserted therein and the chuck is then locked up after which the wrench can be retracted and the chuck again set in rotation for another machining cycle.

The stopping of the chuck in a predetermined position to permit the opening and closing thereof is a time consuming operation because it is necessary, preparatory to opening the chuck, to slow down the chuck and then inch it to a precise stopped position and lock it in that position so that the wrench referred to will make proper engagement with the chuck.

The amount of time consumed in slowing down the chuck and getting it to precise position and locking it in that position preparatory to opening the chuck can amount to as much as 10%, or more, of the machining time so that it will be evident that a substantial amount of machine time is lost in the operation of getting the chuck halted and opened.

Chucks of the nature referred to have also been characterized in that the movable chucking elements or jaw elements in the chuck that are movable for gripping the workpiece in the chuck are so disposed that the high forces developed thereon while the workpiece is gripped in the chuck, and while it is being machined in the chuck, tend to deform the body of the chuck which could result in wear of the machine and deflection of the workpiece from the proper axis of rotation.

The present invention proposes the provision of a chucking arrangement in which the aforementioned drawbacks encountered in chucks known heretofore are eliminated.

A particular object of the present invention is the provision of a center drive chuck wherein the chuck does not have to occupy any precise indexed position to permit the opening and closing thereof.

A still further object of the present invention is the provision of a center drive chuck in which the opening and closing thereof can actually be accomplished during rotation of the chuck or while the chuck is stationary but not necessarily in any precisely indexed position.

Still another object of the present invention is the provision of a center drive chuck having a rotary body and a movable workpiece clamping jaw therein in which the stresses embodied on the chuck body and chuck jaw in the clamping and holding of a workpiece therein do not tend to deform the chuck body.

A still further object of the present invention is the provision of a center drive chuck of the nature referred to, of simplified construction, and wherein force and forces imposed on the chuck during the machining of a workpiece gripped thereby are combined within a localized region of the chuck body.

A still further object of the present invention is the provision of a chucking arrangement of the provision referred to in which a wedging action is had upon the workpiece which not only provides for better gripping of the workpiece, but also permits the chuck automatically to accommodate itself to a certain amount of variation in size of the workpiece.

The objects referred to above, as well as still other objects and advantages of the present invention, will become more apparent upon reference to the following description taken in connection with the accompanying drawing, in which:

FIGURE 1 is a transverse sectional view through a center drive chuck according to the present invention, and showing the drive arrangement for effecting the opening and closing of the chuck;

FIGURE 2 is a vertical sectional view indicated by line 2—2 on FIGURE 1;

FIGURE 3 is a sectional view of a modification;

FIGURE 4 is a sectional view indicated by line 4—4 on FIGURE 1, showing the track arrangement for supporting the drive chain of the actuating device in cross section;

FIGURE 5 shows a partial end view of a chuck having an annular chain ring thereon to actuate the chuck jaw;

FIGURE 6 is a section on line 6—6 of FIGURE 5;

FIGURE 7 is a view like FIGURE 5 but showing an externally toothed ring gear for actuating the chuck jaw;

FIGURE 8 is a section on line 8—8 of FIGURE 7;

FIGURE 9 is a view like FIGURES 5 and 7 but showing an internally toothed ring gear for actuating the chuck jaw; and FIGURE 10 is a section on line 10—10 of FIGURE 9.

Referring to the drawings more in detail, in FIGURE 1 the workpiece being machined is indicated at 10 and it comprises a crankshaft that is to have the line bearing portions 12 thereof turned in a lathe. The crankshaft is gripped in the center drive chuck between stationary anvil elements 14 in the chuck body that have flat surfaces thereon engaging flats machined on a web 16 of the crankshaft while the crankshaft is held tightly against the anvils 14 by a movable chuck or clamping jaw 18 having a member 20 that engages a crank pin bearing position 22 of the crankshaft adjacent web 16.

It will be understood at this point that the anvils 14 could be located on one side only of jaw 18, and engage flats on one web only of the chankshaft or there could be two sets of the anvils engaging two webs of the crankshaft on opposite sides of jaw 18, which would be the two webs at the opposite ends of the crank pin portion 22.

The jaw 18 is somewhat U-shaped in configuration and is pivotally supported on pivot shaft 24 in body 26 of the chuck. Jaw 18 extends beyond pivot shaft 24 and has teeth 28 formed thereon that mesh with a worm 30 on a shaft 32 that is journaled in the chuck body as by the ball or roller bearings indicated at 34. Axial location of the shaft 32 and worm 30 in the chuck body is accomplished by spacing member 36 pinned in the chuck body by pin means 38 and engaging a pair of spaced ones of the aforementioned bearings 34.

The end of shaft 32 carries a skew gear 40 that meshes with another skew gear 42 rotatable in the chuck body. This last mentioned gear is mounted on a shaft 44 together with a spur gear 46 at the side of the chuck body which meshes with another spur gear 48 located further outwardly of the center of the center of the chuck body. Spur gear 48, in turn, meshes with a spur gear 50, supported on a shaft 52, together with a sprocket 54. All of the aforementioned elements are supported by the chuck body 26 and rotate therewith.

Spaced circumferentially about the chuck body from shaft 52 is another shaft 56, carrying another sprocket 58. Entrained over sprockets 54 and 58 is a chain 60 which is confined by track means 62 so that the two reaches of the chain extending between the sprockets are concentric with the axis of rotation of the chuck.

At this point it will be evident that driving of chain 60 in one direction will cause chuck jaw 18 to move in its closing direction whereas driving of chain 60 in the other direction will cause jaw 18 to move in its opening direction.

The chain 60 is adapted for being driven by sprocket 64 mounted on the end of an arm 66 pivoted about a shaft 68 that is journaled in a stationary part 70 of the machine frame. A hydraulic cylinder and piston element 72 is operable by a reversing valve 74 to move arm 66 in a direction to engage sprocket 64 with chain 60 or to retract the sprocket from the chain.

Sprocket 64 is adapted for being driven in rotation by having fixed thereto a gear 76 meshing with a gear 78 mounted on the aforementioned shaft 68, which in turn, is adapted for being driven in one direction or the other by a reversible drive arrangement such as the reversible electric motor 80 which could have a speed reducer associated therewith.

The chuck itself is adapted for being driven in rotation by annular gear means 82 thereon which meshes with a drive pinion 84 on shaft 86 which is rotatable in the frame of the machine.

FIGURE 2 will show that the chuck body is rotatably supported in the stationary frame 88 of the machine by the tapered roller bearings 90. This view will also show the manner in which the several sprockets and gears referred to above are carried by the chuck body for rotation therein while being carried about with the chuck while it rotates.

FIGURE 3 shows a somewhat modified arrangement wherein gear 48, instead of meshing with a gear driven by a chain is adapted for meshing with a movable gear 92 mounted on the swingable arm 94, which arm is actuated by a motor arrangement 96 for bringing the gear 92 into engagement with gear 48 or for moving it into spaced relation thereto. Gear 92 is fixed there to another gear 98 meshing with gear 100 connected for being reversibly driven by motor 102 similarly as with the first described modification.

FIGURE 4 shows how the track arrangement 62 is arranged so that toward the inside of the chuck the wall 104 of the track confines the chain, whereas toward the outside of the chuck the wall 106 of the track is provided with an opening 108 through which sprocket 64 can pass while this portion of the track is further provided with wall means 110 confining the chain on the side toward the center of the chuck so that the outer reach of the chain is properly supported along an arcuate path concentric with the chuck.

In either of the modifications referred to above, the advantages exist that the stresses imposed on the clamping jaw and, therefore, on the chuck body, are substantially confined within the central region of the chuck body due to the wedging action of member 20 of the chuck jaw and its location relative to the pivot shaft 24 of the movable jaw. The further advantage exists that no precise indexed position of the chuck is necessary to enable the chuck opening and closing mechanism to operate. Considerable tolerance is permissible with respect to the stopped position of the chuck, and proper engagement of the opening and closing mechanism of either modification with the chuck will be had.

The wedging action of member 20 also permits some considerable variation in the dimensions of the workpiece without detracting from the gripping action of the chuck. In every case high clamping forces are obtained that are confined to the center of the chuck body.

The present invention therefore provides a chuck device which is relatively simple in construction and which supports the workpiece accurately, even under load, and which can grip the workpiece tightly without deforming the chuck body and which materially shortens the overall working cycle of the associated machine because the chuck can be operated more quickly than if it had to be brought to a precise stopped position for opening and closing.

FIGURES 5 and 6 show how an annular chain track 120 could be mounted on the chuck body 122 and a chain ring 124 in the track engage sprocket 126 for actuating the chuck jaw. Sprocket 126 is fixed to a shaft 128 which corresponds to shaft 52 of the first described modification. A sprocket 130 also meshes with chain ring 124 to the side of the region engaged by sprocket 126 and a motor 132 is provided for selectively driving sprocket 130 in one direction or the other. A clutch 134 is operable for selectively disconnecting the motor from sprocket 130 so the sprocket can rotate freely and thus can be left in engagement with the chain ring at all times, if desired.

Fluid motor 136, however, acting through arm 138 is operable for moving sprocket 130 into and out of engagement with chain ring 124 if this is desired.

FIGURES 7 and 8 show an externally toothed gear ring 140 could be supported on the chuck body in angular support means 142 and in mesh with pinion 144 which corresponds to sprocket 130 of FIGURE 5 and sprocket 54 of FIGURE 1. Drive gear 146 is arranged for being driven by reversible motor 148 via clutch 150 to actuate the ring gear on the chuck body and thereby, through pinion 144, to actuate the chuck jaw. A fluid motor 152, acting through arm 154, is operable for moving drive gear 146 into and out of mesh with the ring gear, as may be desired.

FIGURES 9 and 10 show an arrangement the same as that of FIGURES 7 and 8 except that the ring gear is internally toothed instead of being externally toothed. The same reference numerals as used in FIGURES 7 and 8 are applied to FIGURES 9 and 10 except with the addition of a subscript *a*.

The chain ring of FIGURES 5 and 6 and the ring gears of FIGURES 7–10 are all of advantage over known devices of this nature in that simple operative elements are employed that can be machined according to standard practices. The supporting and guiding of these ring elements can be accomplished easily without difficulty and without special devices.

While ring elements of various natures have been illustrated, it will be understood that where the drive ratio between the input pinion at the surface of the chuck body and the jaw to be moved thereby was such that less than a complete rotation of the ring gear was required from a full open position of the chuck jaw to full closed position thereof, the ring element, particularly where the ring element was a rigid member, could be in the form of an arc suitably supported on the chuck body and fully equivalent results would be had where the external driving gear was arranged to be engaged and disengaged with the arc. It will therefore be understood that such an arrangement is included within the purview of the present invention. I further contemplate the use of elements which drive by friction, in which case the input pinion on the chuck body could be in the form of a V-pulley, for example, engaged by a correspondingly shaped friction driving element and the friction driving element could then be actuated from externally of the chuck body and gearing or by another drive element, such as a V-pulley that could be selectively engaged with the element.

It will be understood that this invention is susceptible to modification in order to adapt it to different usages

I claim:

1. In a center drive chuck; a chuck body, bearing means rotatably supporting said chuck body adjacent the periphery thereof, a substantially centrally located opening extending through the chuck body, anvil means carried by the chuck body extending into the opening for supporting and locating engagement with a workpiece introduced into the chuck through said opening, a substantially U-shaped jaw pivotally mounted in said chuck body, and having a member thereon at the free end of one leg thereof adapted for wedging engagement with a workpiece in the chuck in a region opposite the region of engagement of the workpiece by said anvil means, a pivot shaft in the chuck body on the side of the workpiece opposite the point of engagement of the workpiece by said arm pivotally connecting the arm at the end of the other leg thereof to the chuck body, a gear sector formed on said arm concentric with said pivot shaft, a worm rotatable in said chuck body meshing with said sector, gear means in the chuck body drivingly connected with said worm, drive means carried by said chuck body and disposed adjacent to the periphery of said chuck body in driving connection with said gear means, and reversible driving means including a driving gear, means shiftably mounting said driving gear externally of said chuck body and means for selectively shifting said driving gear into and out of engagement with said drive means.

2. In a center drive chuck; a chuck body, bearing means rotatably supporting said chuck body adjacent the periphery thereof, a substantially centrally located opening extending through the chuck body, anvil means carried by the chuck body extending into the opening for supporting and locating engagement with a workpiece introduced into the chuck through said opening, a substantially U-shaped jaw pivotally mounted in said chuck body, and having a member thereon at the free end of one leg thereof adapted for wedging engagement with a workpiece in the chuck in a region opposite the region of engagement of the workpiece by said anvil means, a pivot shaft in the chuck body on the side of the workpiece opposite the point of engagement of the workpiece by said arm pivotally connecting the arm at the end of the other leg thereof to the chuck body, a gear sector formed on said arm concentric with said pivot shaft, a worm rotatable in said chuck body meshing with said sector, and gear means in the chuck body drivingly connected with said worm and including means adjacent the periphery of the chuck body for actuating the said gear means and worm for opening and closing said arm, said means adjacent the periphery of the chuck body comprising one of said gear means, a driven gear movably mounted externally of said chuck body, and means for selectively moving said driven gear into and out of engagement with said one gear means.

3. In a center drive chuck; a chuck body, bearing means rotatably supporting said chuck body adjacent the periphery thereof, a substantially centrally located opening extending through the chuck body, anvil means carried by the chuck body extending into the opening for supporting and locating engagement with a workpiece introduced into the chuck through said opening, a substantially U-shaped jaw pivotally mounted in said chuck body, and having a member thereon at the free end of one leg thereof adapted for wedging engagement with a workpiece in the chuck in a region opposite the region of engagement of the workpiece by said anvil means, a pivot shaft in the chuck body on the side of the workpiece opposite the point of engagement of the workpiece by said arm pivotally connecting the arm at the end of the other leg thereof to the chuck body, a gear sector formed on said arm concentric with said pivot shaft, a worm rotatable in said chuck body meshing with said sector, gear means in the chuck body drivingly connected with said worm and including means adjacent the periphery of the chuck body for actuating the said gear means and worm for opening and closing said arm, said actuating means comprising a sprocket drivingly connected with one of said gear means, a second sprocket on the chuck body spaced circumferentially from the first mentioned sprocket, a chain entrained over said sprockets, and a driven sprocket located externally of said chuck body and movable selectively into and out of engagement with said chain for driving said chain in respectively opposite directions to open and close said jaw.

4. In a center drive chuck; a chuck body, bearing means rotatably supporting said chuck body adjacent the periphery thereof, a substantially centrally located opening extending through the chuck body, anvil means carried by the chuck body extending into the opening for supporting and locating engagement with a workpiece introduced into the chuck through said opening, a substantially U-shaped jaw pivotally mounted in said chuck body, and having a member thereon at the free end of one leg thereof adapted for wedging engagement with a workpiece in the chuck in a region opposite the region of engagement of the workpiece by said anvil means, a pivot shaft in the chuck body on the side of the workpiece opposite the point of engagement of the workpiece by said arm pivotally connecting the arm at the end of the other leg thereof to the chuck body, a gear sector formed on said arm concentric with said pivot shaft, a worm rotatable in said chuck body meshing with said sector, worm gear means in said body meshing with said worm, a drive shaft operatively connected to said worm gear means and projecting from one side of said body at a point radially removed from the axis of the said body, an annular drive element concentrically mounted on the said one side of said body and rotatable thereon and passing adjacent said drive shaft, means on the drive shaft drivingly engaging said drive element, and reversibly rotatable means mounted adjacent said body and selectively drivingly engageable with said drive element.

5. In a center drive chuck; a chuck body, bearing means rotatably supporting said chuck body adjacent the periphery thereof, a substantially centrally located opening extending through the chuck body, anvil means carried by the chuck body extending into the opening for supporting and locating engagement with a workpiece introduced into the chuck through said opening, a substantially U-shaped jaw pivotally mounted in said chuck body, and having a member thereon at the free end of one leg thereof adapted for wedging engagement with a workpiece in the chuck in a region opposite the region of engagement of the workpiece by said anvil means, a pivot shaft in the chuck body on the side of the workpiece opposite the point of engagement of the workpiece by said arm pivotally connecting the arm at the end of the other leg thereof to the chuck body, a gear sector formed on said arm concentric with said pivot shaft, a worm rotatable in said chuck body meshing with said sector, worm gear means in said body meshing with said worm, a drive shaft operatively connected to said worm gear means and projecting from one side of said body at a point radially removed from the axis of said body, a chain ring concentrically mounted on said body and rotatable thereon, a sprocket on said drive shaft meshing with said chain ring, and a reversibly driven drive sprocket adjacent said body selectively engageable with said chain ring.

6. In a center drive chuck; a chuck body, bearing means rotatably supporting said chuck body adjacent the periphery thereof, a substantially centrally located opening extending through the chuck body, anvil means carried by the chuck body extending into the opening for supporting and locating engagement with a workpiece introduced into the chuck through said opening, a substantially U-shaped jaw pivotally mounted in said chuck body, and having a member thereon at the free end of one leg thereof adapted for wedging engagement with a workpiece in the chuck in a region opposite the region of engagement of the workpiece by said anvil means, a pivot shaft in the chuck body on the side of the workpiece opposite the point of engagement of the workpiece by said arm pivotally connecting the arm at the end of the other leg thereof to the chuck body, a gear sector formed on said arm concentric with said pivot shaft, a worm rotatable in said chuck body meshing with said sector, worm gear means in said body meshing with said worm, a drive shaft operatively connected to said worm gear means and projecting from one side of said body at a point radially removed from the axis of the said body, a gear ring having teeth on one only of the inside and outside thereof concentrically mounted on said body and rotatable thereon, a pinion on the drive shaft meshing with said gear ring, and a reversibly driven drive gear adjacent said body and meshing with said gear ring to one side of the region of the gear ring engaged by the said pinion whereby as the chuck body rotates the said pinion can pass by said drive gear.

7. The arrangement of claim 6 in which a reversible motor is provided for driving the drive gear, and a clutch is connected between the motor and the drive gear for selectively connecting the drive gear to the motor.

8. The arrangement according to claim 6 in which said drive gear is mounted on a swingable arm and is selectively movable into and out of mesh with said gear ring.

9. The arrangement according to claim 6 wherein said gear ring is internally toothed.

10. The arrangement according to claim 6 wherein said gear ring is externally toothed.

References Cited by the Examiner
UNITED STATES PATENTS

| | | | |
|---|---|---|---|
| 1,934,976 | 11/1933 | Groene et al. | 82—9 |
| 2,160,967 | 6/1939 | Groene et al. | |
| 2,511,741 | 6/1950 | Schulz. | |
| 2,544,966 | 3/1951 | Schulz. | |
| 2,670,646 | 3/1954 | Kendall et al. | |

WILLIAM W. DYER, Jr., *Primary Examiner.*

L. VLACHOS, *Assistant Examiner.*